(12) United States Patent
Inoue et al.

(10) Patent No.: US 7,906,934 B2
(45) Date of Patent: Mar. 15, 2011

(54) POWER SOURCE APPARATUS AND CONTROL METHOD OF THE POWER SOURCE APPARATUS

(75) Inventors: Toshio Inoue, Saitama (JP); Yasuhiro Nakada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 11/910,059

(22) PCT Filed: Mar. 9, 2006

(86) PCT No.: PCT/JP2006/304602
§ 371 (c)(1),
(2), (4) Date: Sep. 28, 2007

(87) PCT Pub. No.: WO2006/112201
PCT Pub. Date: Oct. 26, 2006

(65) Prior Publication Data
US 2008/0272653 A1    Nov. 6, 2008

(30) Foreign Application Priority Data
Mar. 31, 2005 (JP) .................... 2005-101033

(51) Int. Cl.
*H02J 7/00* (2006.01)
(52) U.S. Cl. ................. 320/101; 320/128; 320/140
(58) Field of Classification Search ............ 320/101
See application file for complete search history.

(56) References Cited

U.S. PATENT DOCUMENTS

| | | | | |
|---|---|---|---|---|
| 5,929,538 | A | * | 7/1999 | O'Sullivan et al. ............ 307/66 |
| 6,081,104 | A | * | 6/2000 | Kern ............................ 323/268 |
| 2003/0201674 | A1 | * | 10/2003 | Droppo et al. ................. 307/82 |
| 2004/0207366 | A1 | * | 10/2004 | Sung ............................. 320/140 |

FOREIGN PATENT DOCUMENTS

| | | |
|---|---|---|
| JP | 61-030920 A | 2/1986 |
| JP | 6-266454 A | 9/1994 |
| JP | 8-186927 A | 7/1996 |
| JP | 8-223816 A | 8/1996 |
| JP | 08-237884 A | 9/1996 |
| JP | 2003-079068 A | 3/2003 |
| JP | 2003-219578 A | 7/2003 |

OTHER PUBLICATIONS

International Search Report of PCT/JP2006/304602, date of mailing Jun. 13, 2006.
Notification of Transmittal of Translation of the International Preliminary Report on Patentability (Form PCT/IB/338) of International Application No. PCT/JP2006/304602 mailed Aug. 21, 2008 with Forms PCT/IB/373 and PCT/ISA/237.

* cited by examiner

*Primary Examiner* — Edward Tso
*Assistant Examiner* — Johali A Torres Ruiz
(74) *Attorney, Agent, or Firm* — Westerman, Hattori, Daniels & Adrian, LLP

(57) ABSTRACT

The present invention provides a solar cell that can be utilized as a stable electric power source for cloudy weather. An output voltage V1 of the solar cell 1 is lowered by a DC-DC converter 5. When a battery V2 is charged with an output of the converter 5, the converter 5 is stopped and the power of only the battery V2 is supplied to a low-voltage inverter circuit 6. The electric power supplied from the converter 5 is increased by boosting the output voltage of the converter 5 as well as starting to supply electric power from the battery V2. While the electric power of the converter 5 is increased, the performance of the solar cell 1 is judged. When the performance is decreased, the output voltage from the converter 5 is lowered and the amount of electric power supplied from the battery 2 is increased relatively.

6 Claims, 3 Drawing Sheets

POWER SOURCE APPARATUS AND CONTROL METHOD OF THE POWER SOURCE APPARATUS

BACKGROUND OF THE INVENTION

1. Field of the Invention

The present invention relates to a power source apparatus and a control method of the power source apparatus, and more particularly to a power source apparatus in which a power source such as an engine-driven power generator and a solar cell are combined so that the power generation output thereof can be taken out, as well as a control method of the power source apparatus.

2. Description of the Related Art

A small-scale power generating apparatus such as an engine-driven power generator is prevalent for various uses as a portable power source apparatus and a power source apparatus for emergency. In the case of using a power source apparatus of this kind as a small-scale power generating apparatus such as a co-generation apparatus for domestic use, it can be systematically linked with a commercial power source or a solar cell can be provided in combination, whereby a comprehensive effective use of energy can be achieved.

For example, in Japanese Patent Application Laid-Open No. 8-186927, a power source system in which the output of a commercial power source (system), the output of a solar light power generating apparatus (solar cell), and the output of a power generating apparatus (power generator) using a fuel are linked and connected, is disclosed. Patent Document 1: Japanese Patent Application Laid-Open No. 8-186927

In the power source system described in Japanese Patent Application Laid-Open No. 8-186927, the solar cell output and the power generator output, or the solar cell output and the system output are linked and connected, so that the output voltage of the solar cell must be set to be high. However, with a small-scale solar cell power generation for domestic use, one cannot obtain a high-voltage output when the weather is cloudy, thereby raising a problem in that the power generation electric power of the solar cell can hardly be fully utilized.

Also, when the power generation output of the solar cell is small, such as at the time of cloudy weather, it will not be a much effective electric power source even if this power generation output is supplied to a load. Rather, since the electric power source is not stable, the control is liable to be unstable, such as necessitating repetition of an operation of starting and stopping the system-linked output.

An object of the present invention is to provide a power source apparatus that can effectively utilize the power generation electric power even when the output voltage is not so high, such as at the time of cloudy weather, as well as a control method of the power source apparatus.

SUMMARY OF THE INVENTION

The first characteristic feature of the present invention lies in that a power source apparatus includes a DC-DC converter that controls an output of a solar cell, a battery that is charged with an output of the DC-DC converter, and an inverter into which an output of the DC-DC converter and an output of the battery are input in parallel, is so constructed that the battery is charged with the output of the DC-DC converter when a remaining amount of the battery is below or equal to a predetermined amount, that the output of the DC-DC converter is supplied to the inverter when an output electric power of the solar cell exceeds a predetermined value, that the output of the DC-DC converter is supplied to the battery for charging the battery without supplying the output to the inverter when the output electric power of the solar cell is below or equal to the predetermined value, and that a supply of electric power from the battery to the inverter is started when the battery is charged to a predetermined amount.

The second characteristic feature of the present invention lies in that the power source apparatus further includes means for gradually raising an output voltage of the DC-DC converter from a value lower than a voltage value of the battery until an output voltage of the battery becomes zero, when supply of electric power from the solar cell to the inverter is started.

The third characteristic feature of the present invention lies in that an operation of the DC-DC converter is stopped when an output electric power of the solar cell is below or equal to a predetermined value that is detected by finding a switching duty of the DC-DC converter has risen above or equal to a predetermined value when an electric power supplied to the inverter is at a predetermined value.

The fourth characteristic feature of the present invention lies in that the supply of electric power from the battery to the inverter is stopped when a remaining amount of the battery becomes below or equal to a predetermined amount.

The fifth characteristic feature of the present invention lies in that the power source apparatus further includes a power generator as a power source, that the DC-DC converter is a voltage-lowering type, and that a voltage-booster converter that inputs an output of the battery into the inverter by raising a voltage of the battery and a rectifying circuit that supplies an output of the power generator to the inverter by rectifying the output of the power generator are connected in parallel.

The sixth characteristic feature of the present invention lies in that a method of controlling a power source apparatus including a solar cell, a DC-DC converter that controls an output of the solar cell, a battery that is charged with an output of the DC-DC converter, and an inverter into which an output of the DC-DC converter and an output of the battery are input in parallel, is so constructed that an output voltage of the DC-DC converter is raised to be above a voltage of the battery in a state in which an output electric power of the solar cell exceeds a predetermined value, that the output voltage of the DC-DC converter is lowered to be below a voltage of the battery or an operation of the DC-DC converter is stopped when the output electric power of the solar cell is below or equal to the predetermined value, that an output of the DC-DC converter is supplied to the battery for charging the battery without supplying the output of the DC-DC converter to the inverter when a remaining amount of the battery is below a predetermined amount, and that the output voltage of the DC-DC converter is lowered to be below a voltage of the battery or an operation of the DC-DC converter is stopped in a state in which the remaining amount of the battery has risen above or equal to the predetermined amount.

According to the present invention having the first characteristic feature, when the remaining amount of the battery is small, first the battery is charged to a predetermined amount. Then, when the output electric power of the solar cell is small, electric power is supplied from the battery to the inverter, whereas when the output electric power of the solar cell is large, electric power is supplied from the solar cell to the inverter instead of supplying electric power from the battery. Therefore, when the output of the solar cell is small, such as at the time of cloudy weather, electric power from the battery which is a stable electric power source is used and, when the remaining amount of the battery decreases, the battery is charged with the output of the solar cell. At the time of fine weather, the output electric power of the solar cell is large, and a predetermined electric power amount can be stably ensured, so that the output thereof is used by being converted into an alternating current via the inverter. In this manner, the electric power stored in the battery or a sufficiently large electric power at the time of fine weather can be used, thereby ensuring a stable electric power source.

According to the second characteristic feature, by controlling the output of the solar cell with the DC-DC converter, the state of supplying electric power to the inverter only from the battery can be switched to the state of supplying electric power from the solar cell without sudden change in the output.

According to the third characteristic feature, the electric power supply source can be switched from the solar cell to the battery by determining that the output electric power of the solar cell is insufficient because of cloudy weather or the like by finding that a switching duty of the DC-DC converter has risen above or equal to a predetermined value, thereby enabling stable electric power supply.

According to the fourth characteristic feature, when the remaining amount of the battery becomes small, electric power supply from the battery to the inverter can be stopped, thereby avoiding unstable electric power supply. Further, while the output from the battery is stopped, the battery can be charged by effectively utilizing the output of the solar cell which is in a small-output state.

According to the fifth characteristic feature, the output of the solar cell is used by lowering the voltage of the solar cell to the battery voltage which is a low voltage, the solar cell can be used for charging the battery even in a state in which the output thereof is not so high. Also, this contributes to lowering the costs because the output of the solar cell can be used via the battery having a low-voltage specification.

According to the sixth characteristic feature, when the output of the solar cell is large, the stable electric power of the solar cell can be supplied. When the output electric power of the solar cell is small, the output thereof is used only for charging the battery and, when the remaining amount of the battery is sufficient, the supply from the DC-DC converter can be stopped, and the stable electric power of the battery can be supplied to the inverter.

DESCRIPTION OF THE REFERENCE NUMERALS

1 . . . solar cell, 2 . . . battery, 3 . . . power generator, 4, system power source, 5 . . . DC-DC converter, 6 . . . low-voltage inverter circuit, 7 . . . insulating transformer voltage-booster circuit, 10 . . . voltage-booster converter, 11 . . . high-voltage inverter circuit, 13 . . . solar cell electric power detecting unit, 15 . . . battery remaining amount detecting unit, 17 . . . battery electric power detecting unit

DESCRIPTION OF THE PREFERRED EMBODIMENT

Figure 1:
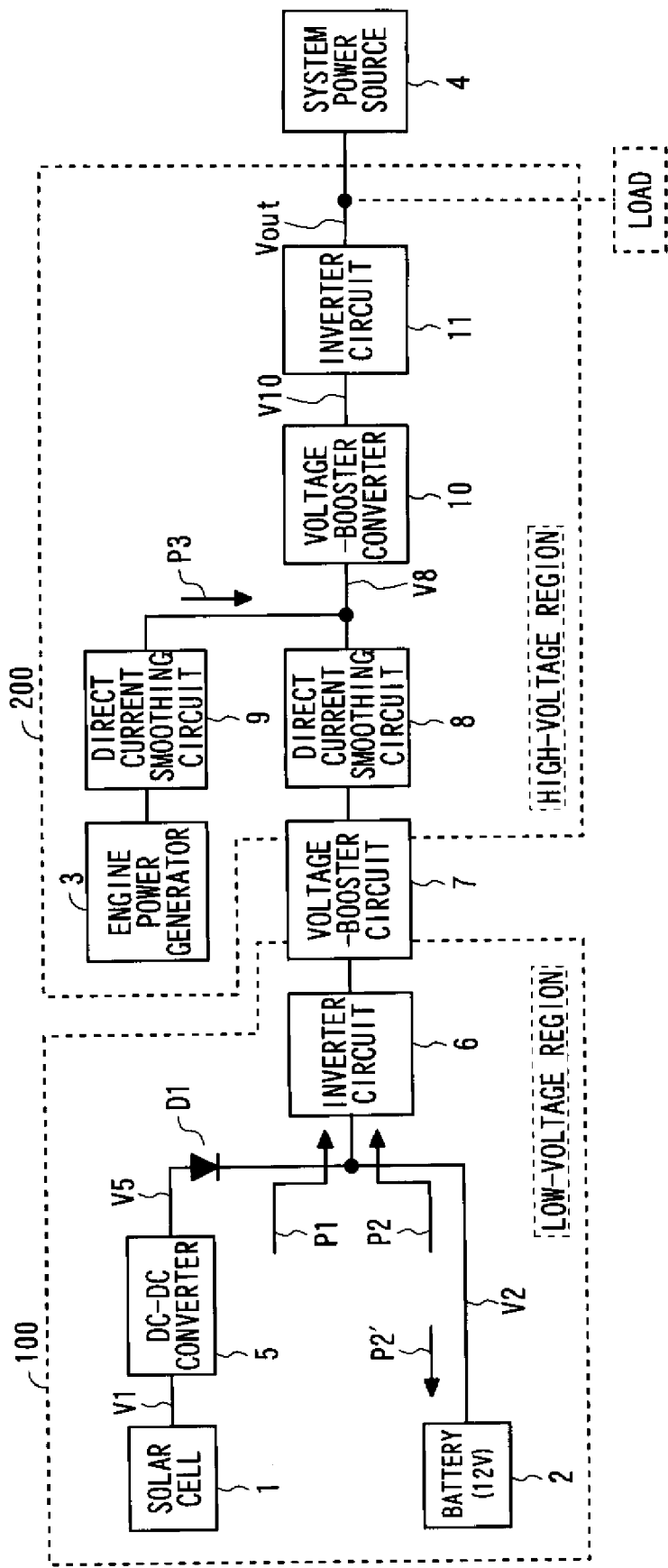
FIG. 1 is a block diagram illustrating a construction of a power source apparatus according to one embodiment of the present invention.

Hereinafter, one embodiment of the present invention will be described in detail with reference to the attached drawings. FIG. 1 is a block diagram illustrating a construction of a power source apparatus in which the output of a solar cell and the output of an engine power generator are linked with a commercial electric power system. The power source apparatus shown in FIG. 1 includes a solar cell 1, a battery 2, and an engine power generator 3 as power sources. The battery 2 can be charged with the output of the solar cell. The following description will be given assuming that the battery 2 has a rated voltage of 12 volt and a fully charged voltage of 14.5 volt. The engine power generator 3 is a three-phase multiple-pole magnet power generator that is driven by a gas internal combustion engine using a city gas as a fuel. The outputs of the solar cell 1, the battery 2, and the engine power generator 3 are linked in an integrated state to a system power source 4. The driving source of the engine power generator 3 is not limited to a gas internal combustion engine but may be an engine of a kind that uses a different fuel such as gasoline.

The power source apparatus is made of an element constituting a low-voltage region 100 and an element constituting a high-voltage region 200. The low-voltage region 100 includes the solar cell 1, the battery 2, a DC-DC converter 5, and a low-voltage inverter circuit 6. On the other hand, the high-voltage region 200 includes the engine power generator 3, direct current smoothening circuits 8, 9, a voltage-booster converter 10, and a high-voltage inverter circuit 11. The high-voltage inverter circuit 11 can include an LC filter circuit. The output of the high-voltage inverter circuit 11 is connected to the system power source 4.

The low-voltage region 100 and the high-voltage region 200 are coupled by an insulating transformer voltage-booster circuit 7 disposed between the low-voltage inverter circuit 6 and the direct current smoothening circuit 8.

The DC-DC converter 5 is made of a non-insulating voltage-lowering chopper, and the voltage-booster converter 10 is made of a non-insulating voltage-booster chopper. The DC-DC converter 5 outputs the input voltage after lowering the input voltage by controlling the duty (on-time ratio) of the switching element such as an FET constituting the chopper. The voltage-booster converter 10 outputs the input voltage after raising the input voltage by controlling the duty of the switching element such as an FET constituting the chopper. The low-voltage inverter circuit 6 is a circuit that converts the input into a rectangular-wave alternating current, and constitutes a bridge with switching elements such as an FET. The high-voltage inverter circuit 11 is a circuit that converts the input into a single-phase alternating current that suits the system linkage, and is made by bridge connection of switching elements such as an FET. For an FET driving circuit that controls the duty of the FET, a well-known one can be used.

The output voltage V1 of the solar cell 1 is lowered by the DC-DC converter 5 to become a voltage V5 which is applied to the battery 2 via a diode D1. The lowered voltage V5 of the solar cell 1 and the voltage V2 of the battery 2 are applied in an integrally matched state (V5=V2) to the low-voltage inverter circuit 6 to be converted into a rectangular-wave alternating current. This rectangular-wave alternating current further undergoes voltage rising by the insulating transformer voltage-booster circuit 7 to become a high-voltage rectangular-wave alternating current to be input into the direct current smoothening circuit 8. The low-voltage inverter circuit 6 and the insulating transformer voltage-booster circuit 7 constitute a voltage-booster circuit for raising the battery voltage. The direct current smoothening circuit 8 rectifies and smoothens the input high-voltage rectangular-wave alternating current and outputs a direct-current voltage.

The three-phase alternating current that is output from the engine power generator 3 is rectified and smoothened by the direct current smoothening circuit 9. The electric power P3 that is output from the direct-current smoothening circuit 9 is integrated with the electric power that is output from the direct current smoothening circuit 8, and the voltage (power generator direct-current voltage) V8 is input into the voltage-booster converter 10. The voltage (linkage direct-current voltage) V8 that has been raised by the voltage-booster converter 10 is input into the high-voltage inverter circuit 11 to be converted into a single-phase alternating current of a system linkage alternating-current voltage Vout, and is linked to the system power source 4 after undergoing noise reduction by the LC filter circuit.

The duty of the voltage-booster converter 10 is set so as to restrain fluctuation in the output of the power generator 3 and the output of the solar cell 1 and the battery 2, and to output the linkage direct-current voltage V10 that is needed in maintaining the system linkage alternating-current voltage Vout. The high-voltage inverter circuit 11 forms a system linkage alternating current having the same quality (as to voltage, frequency, noise, and others) as the system power source 4 and has a system linkage function that links by achieving synchronization with the phase of the system power source 4. Namely, the high-voltage inverter circuit 11 constitutes a system linkage controlling unit. One example of an apparatus having the system linkage function is disclosed in Japanese Patent Application Publication No. 04-10302.

When the output of the solar cell 1 is small, the output electric power of the solar cell 1 is used only for charging the battery 2. When the battery voltage V2 becomes above or equal to a predetermined value, for example, a voltage value Vref corresponding to the standard output voltage, electric power is supplied from the battery 2 to the low-voltage inverter circuit 6.

An operation of the above-described power source apparatus will be described together with a flowchart. When the power source apparatus is in an initial state, the DC-DC converter 5, the low-voltage inverter circuit 6, the power generator 3, the voltage-booster converter 10, and the high-voltage inverter circuit 11 are in a state of stopped operation. Therefore, electric power is not output to the system power source 4.

Figure 2:
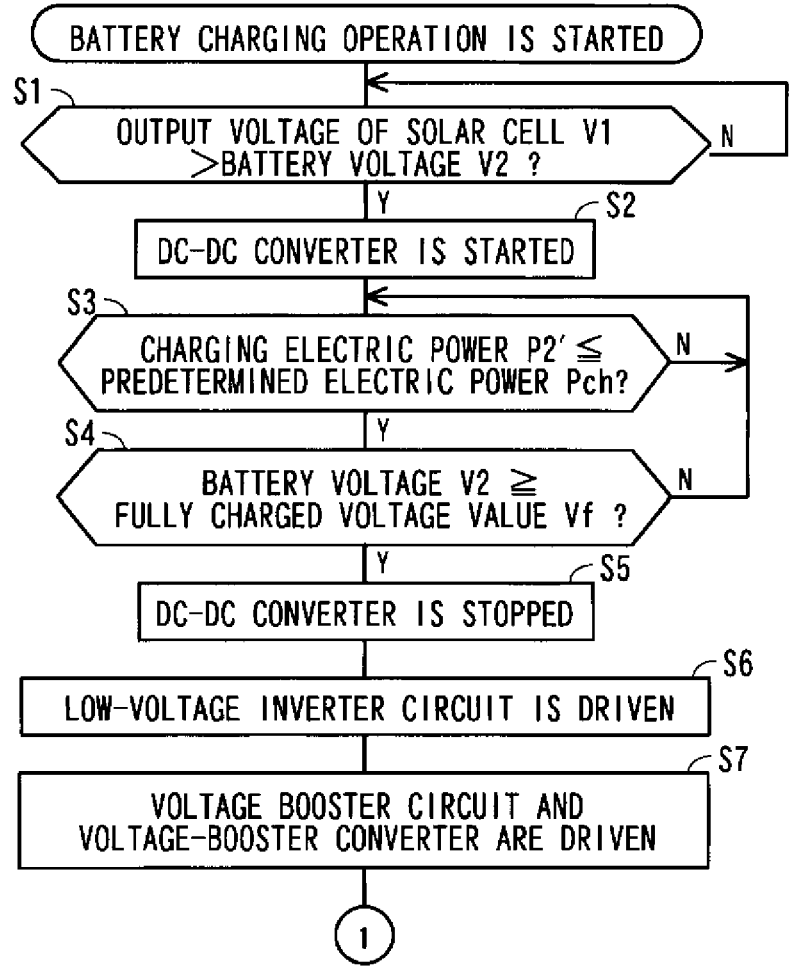
FIG. 2 is a flow chart (part 1) showing an operation of the power source apparatus according to one embodiment of the present invention.

FIG. 2 is a flowchart (part 1) showing an operation of the power source apparatus. Here, power generation of the system linkage output by the battery 2 will be described. In step S1, it is determined whether or not the output voltage V1 of the solar cell 1 is higher than the voltage (battery voltage) V2 of the battery 2. When the output voltage of the solar cell 1 is higher than the battery voltage V2, the flow proceeds to step S2, where an operation of the DC-DC converter 5 is started. The duty of the DC-DC converter 5 is controlled so that the output voltage V5 thereof will be maintained to be higher than the battery voltage V2. The battery 2 is charged with this output voltage V5.

In step S3, it is determined whether or not the electric power P2' supplied to the battery 2 is below or equal to a predetermined electric power Pch of the battery 2. When the battery 2 is fully charged, the charging electric power P2' will decrease, so that whether the battery 2 is fully charged or not can be determined in step S3. Further in step S4, the determination of full charge is carried out for certainty. In step S4, it is determined whether or not the battery voltage V2 is above or equal to the fully charged voltage value Vf (14.5 volt). If the answer is affirmative in both of step S3 and step S4, it is determined that the battery 2 is fully charged, and the flow proceeds to step S5 where the operation of the DC-DC converter 5 is stopped (the duty is set to be zero). Namely, the charging of the battery 2 is temporarily stopped.

In step S6, the low-voltage inverter circuit 6 is driven. The duty of the low-voltage inverter circuit 6 is controlled so that the power generator direct-current voltage V5 will be a predetermined voltage in consideration of the amount of voltage rising in the insulating transformer voltage-booster circuit 7. In step S7, driving of the voltage-booster converter 10 and the high-voltage inverter circuit 11 is started, so as to output the electric power Pout that is linked with the system power source 4. The set value of the system linkage output Pout of the first stage is set to be 50 watts. Here, the DC-DC converter 5 is stopped, and the power generator 3 has not started operating, so that only the power generation output from the battery 2 is linked to the system power source 4.

Figure 3:
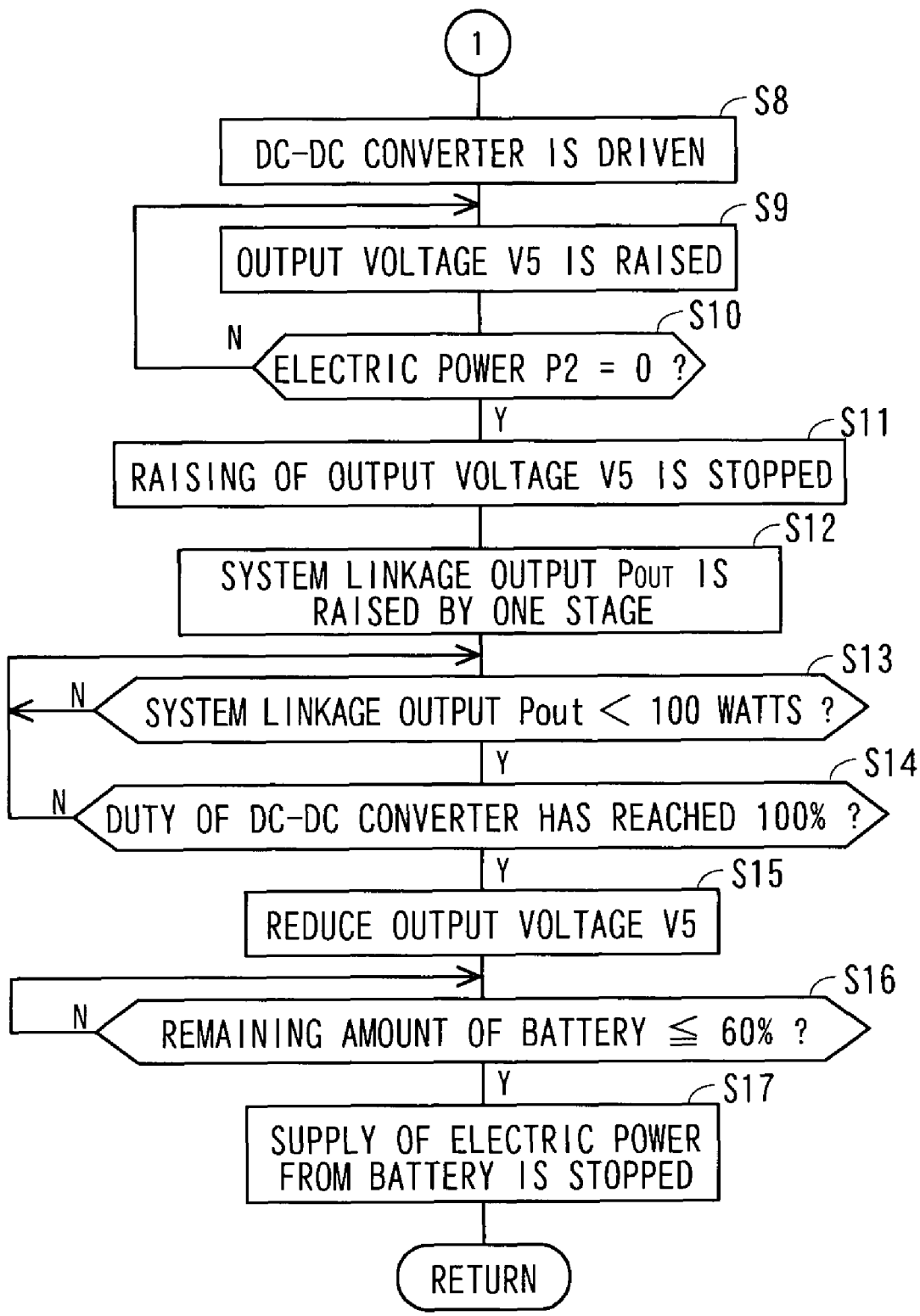
FIG. 3 is a flow chart (part 2) showing an operation of the power source apparatus according to one embodiment of the present invention.

FIG. 3 is a flowchart (part 2) showing an operation of the power source apparatus. Here, the power generation of the system-linkage output by the solar cell 1 will be described in continuance to FIG. 2. In step S8, the DC-DC converter 5 is driven. At this time, first the duty of the DC-DC converter 5 is controlled so that the output voltage V5 of the DC-DC converter 5 will be below or equal to the battery voltage V2. Then, in step S9, the output voltage V5 is gradually raised (for a preset amount). By raising the duty of the DC-DC converter 5 step by step, the output voltage V5 can be gradually raised.

In a region where the output voltage V5 of the DC-DC converter 5 is lower than the battery voltage V2 (+forward voltage of the diode D1), the output electric power P1 of the solar cell 1 is not input into the low-voltage inverter circuit 6, so that the output electric power P1 of the solar cell 1 is not supplied to the low-voltage inverter circuit 6, and only the electric power P2 from the battery 2 is supplied to the low-voltage inverter circuit 6.

In step S10, it is determined whether or not the electric power P2 supplied from the battery 2 to the low-voltage inverter circuit 6 has become a set electric power value (preferably zero). When the output voltage V5 of the DC-DC converter 5 has risen above or equal to the battery voltage V2, the output electric power P1 of the DC-DC converter 5 will be supplied to the low-voltage inverter circuit 6 instead of the output electric power from the battery 2, so that the supply of electric power from the battery 2 will be stopped. Then, if the answer in step S10 is affirmative, it is determined that the output voltage V5 has been fully raised, so that the flow proceeds to step S11 where the raising of the output voltage V5 of the DC-DC converter 5 is stopped. In step S12, the setting of the system linkage output Pout is raised by one stage. In this example, one stage is assumed to be 50 watts, so that the set value of the system linkage output Pout is changed to 100 watts.

At the time of fine weather, the output voltage V5 of the DC-DC converter 5 is maintained to be high, so that the electric power P2 of the battery 2 remains zero, and only the electric power P1 supplied from the DC-DC converter 5 to the low-voltage inverter circuit 6 increases. Namely, at the time of fine weather, the stored electric power of the battery 2 is not used. At this time, the set value of the electric power Pout that is linked with the system power source can be further raised.

When a large output of the solar cell 1 cannot be obtained such as at the time of cloudy weather (the case in which the weather is not fine), the DC-DC converter 5 is operated with an increased duty for maintaining a predetermined output voltage V5.

In step S13, it is determined whether or not the set value of the system linkage output Pout is below or equal to a predetermined value (for example, 100 watts). When the set value of the system linkage output Pout is below or equal to 100 watts, it is further determined in step S14 whether or not the duty of the DC-DC converter 5 has reached a predetermined value (100%). If the answer is affirmative in both of step S13 and step S14, it is determined to be the time of cloudy weather or the like which is not sufficient for obtaining an output of 100 watts. If the answer is not affirmative, electric power supply from the solar cell 1 is continued while maintaining this state.

When it is determined that the weather is cloudy or the like, the flow proceeds to step S15 to reduce the output voltage V5 of the DC-DC converter 5, whereby the duty of the DC-DC converter 5 is gradually lowered to be zero. When the output voltage lowers to be below or equal to the voltage of the battery 2 by decrease of the duty of the DC-DC converter 5, the system linkage output is supplied only from the battery 2. Therefore, the remaining amount of the battery 2 gradually lowers. In step S16, it is determined whether or not the remaining amount of the battery 2 has been lowered to a predetermined value (for example, 60%). While the determination in step S16 is negative, the supply of electric power from the battery 2 is continued. If the determination of step S16 is affirmative, all of the low-voltage inverter circuit 6, the voltage-booster converter 10, and the high-voltage inverter circuit 11 are stopped, whereby the supply of electric power from the battery 2 is stopped (step S17). The state in which the remaining amount of the battery 2 is below 60% is the same as the initial state, so that the flow returns to step S1 in FIG. 2, where the process of charging the battery 2 is started.

The processes of FIGS. 2 and 3 are the processes in the case in which the engine power generator 3 is not operated. When the engine power generator 3 is operated, the output electric power P3 of the power generator 3 adds to the electric power from the solar cell 1 and the battery 2, so that the control is made by adding the electric power P3 to the set value of the system linkage output. Namely, the set value of the system linkage output Pout may be set or the determination in step S15 or the like may be carried out in consideration of the added amount brought by the electric power P3. For example, assuming that the output electric power P3 of the engine power generator 3 is 1 kilowatts, the determination in step S15 is carried out assuming that the set value of the system linkage output Pout is 1.1 kilowatts instead of 100 watts.

Figure 4:
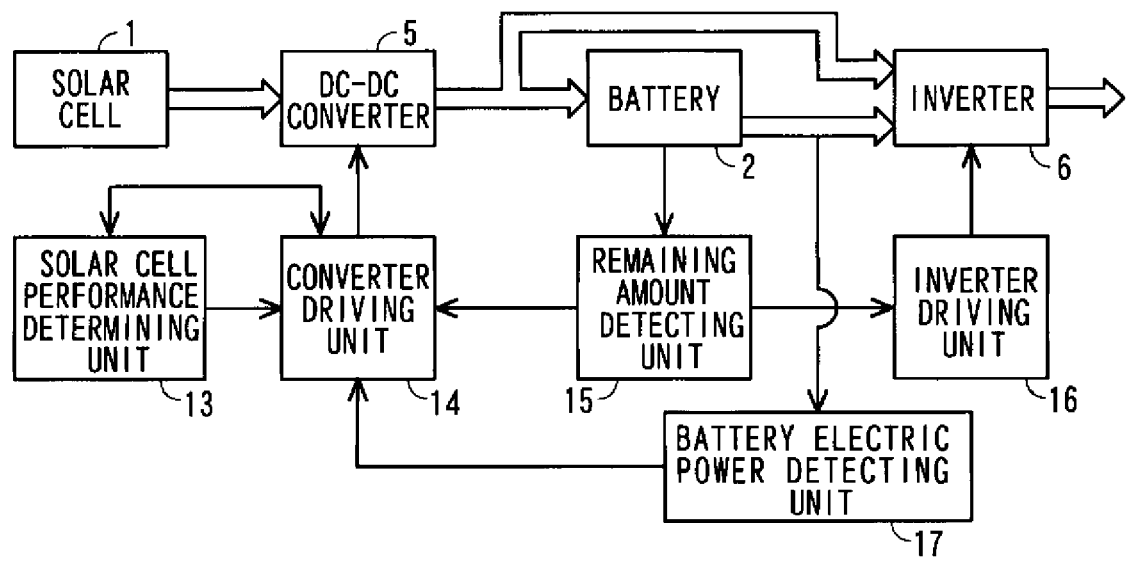
FIG. 4 is a block diagram illustrating an essential part controlling function of the power source apparatus according to one embodiment of the present invention.

FIG. 4 is a block diagram showing an essential part function of the present embodiment. In FIG. 4, a solar cell performance determining unit 13 determines whether or not the solar cell 1 is generating a sufficiently large output. A converter driving unit 14 controls the duty of the DC-DC converter 5. A remaining amount detecting unit 15 detects the remaining amount (represented by the output voltage) of the battery 2. An inverter driving unit 16 controls switching of the switching elements of the low-voltage inverter circuit 6. A battery electric power detecting unit 17 monitors the output electric power of the battery 2. Here, in FIG. 4, for simplifying the description, the function of the high-voltage region 200 is omitted.

The remaining amount detecting unit 15 generates a voltage for charging the battery 2 by driving the DC-DC converter 5 when the remaining amount of the battery 2 is below or equal to a predetermined value. The inverter driving circuit 16 stops operating the low-voltage inverter circuit 6 until the battery 2 is charged. When the battery 2 is charged, the inverter driving circuit 16 starts operating the low-voltage inverter circuit 6. After the operation of the low-voltage inverter circuit 6 is started, the converter driving unit 14 controls the duty of the DC-DC converter 5 so as to raise the output voltage of the DC-DC converter 5.

The battery electric power detecting unit 17 stops raising the output voltage of the DC-DC converter 5 when the output electric power of the battery 2 has become zero. The solar cell performance determining unit 13 senses the duty for driving the DC-DC converter 5 that is output from the converter driving unit 14. When the duty is 100%, it is determined that the power generation state of the solar cell 1 is not sufficient to meet the present output demands, and the solar cell performance determining unit 13 lowers the switching duty of the DC-DC converter 5 to lower the output voltage thereof. When the output voltage of the DC-DC converter 5 lowers relative to the battery voltage, electric power is supplied to the low-voltage inverter circuit 6 only from the battery 2. When the remaining amount of the battery 2 lowers, the low-voltage inverter circuit 6 is stopped, and the DC-DC converter 5 generates an output for charging the battery 2.

What is claimed is:

1. A power source apparatus comprising:
   a solar cell;
   a DC-DC converter that controls an output of the solar cell;
   a battery that is charged with an output of the DC-DC converter;
   an inverter into which an output of said DC-DC converter and an output of said battery are input in parallel; and
   converter driving means that drives said DC-DC converter when a remaining amount of said battery is below or equal to a predetermined amount so that the battery can be charged with the output of said DC-DC converter, wherein
   said converter driving means supplies the output of said DC-DC converter to said inverter when an output electric power of said solar cell exceeds a predetermined value,
   said converter driving means supplies the output of said DC-DC converter to said battery for charging the battery without supplying the output to said inverter when the output electric power of said solar cell is below or equal to the predetermined value, and
   said converter driving means starts supplying electric power from the battery to said inverter when said battery is charged to a predetermined amount without supplying the output of said DC-DC converter to said inverter while the output electric power of said solar cell remains below or equal to the predetermined value.

2. The power source apparatus according to claim 1, further comprising means for gradually raising an output voltage of said DC-DC converter from a value lower than a voltage value of said battery until an output voltage of said battery becomes zero, when supply of electric power from said solar cell to the inverter is started.

3. The power source apparatus according to claim 1, wherein
   an operation of said DC-DC converter is stopped when an output electric power of said solar cell is below or equal to a predetermined value that is detected by finding a switching duty of said DC-DC converter has risen above or equal to a predetermined value when an electric power supplied to said inverter is at a predetermined value.

4. The power source apparatus according to claim 3, wherein
   supply of electric power from the battery to said inverter is stopped when a remaining amount of said battery becomes below or equal to a predetermined amount.

5. The power source apparatus according to claim 1, further comprising a power generator, wherein
said DC-DC converter is a voltage-lowering type, and
a voltage-booster converter that inputs an output of said battery into the inverter by raising a voltage of said battery and a rectifying circuit that supplies an output of said power generator to said inverter by rectifying the output of said power generator are connected in parallel.

6. A method of controlling a power source apparatus that includes a solar cell; a DC-DC converter that controls an output of the solar cell; a battery that is charged with an output of the DC-DC converter; and an inverter into which an output of said DC-DC converter and an output of said battery are input in parallel, comprising the steps of:

raising an output voltage of said DC-DC converter to be above a voltage of said battery in a state in which an output electric power of said solar cell exceeds a predetermined value, lowering the output voltage of said DC-DC converter to be below a voltage of said battery or stopping an operation of the DC-DC converter when the output electric power of said solar cell is below or equal to the predetermined value, supplying an output of said DC-DC converter to said battery for charging the battery without supplying the output of said DC-DC converter to said inverter when a remaining amount of said battery is below a predetermined amount, lowering the output voltage of said DC-DC converter to be below a voltage of said battery or stopping an operation of the DC-DC converter in a state in which the remaining amount of said battery has risen above or equal to the predetermined amount, and providing electric power from the battery to said inverter when said battery has risen above or equal to the predetermined amount without supplying the output of said DC-DC converter to said inverter while the output electric power of said solar cell remains below or equal to the predetermined value.

* * * * *